US009284947B2

(12) United States Patent
Xia

(10) Patent No.: US 9,284,947 B2
(45) Date of Patent: Mar. 15, 2016

(54) RESPONSIVE WINDMILL

(71) Applicant: Zhong Ai Xia, Pittsburgh, PA (US)

(72) Inventor: Zhong Ai Xia, Pittsburgh, PA (US)

( * ) Notice: Subject to any disclaimer, the term of this patent is extended or adjusted under 35 U.S.C. 154(b) by 36 days.

(21) Appl. No.: 14/328,806

(22) Filed: Jul. 11, 2014

(65) Prior Publication Data

US 2016/0010624 A1    Jan. 14, 2016

(51) Int. Cl.
*F03D 7/06* (2006.01)
*F03D 3/06* (2006.01)
*F03D 3/00* (2006.01)

(52) U.S. Cl.
CPC .............. *F03D 3/068* (2013.01); *F03D 3/005* (2013.01); *F03D 7/06* (2013.01)

(58) Field of Classification Search
CPC ......... F03D 3/005; F03D 3/067; F03D 3/068; F03D 7/06; F05B 2260/72; F05B 2260/77; F05B 2260/71

USPC ............ 415/4.2, 4.4, 907; 416/46, 49–51, 41, 416/44, 111, 118, 119, 136, 138, 140
See application file for complete search history.

(56) References Cited

U.S. PATENT DOCUMENTS

| | | | | | |
|---|---|---|---|---|---|
| 1,582,361 | A | * | 4/1926 | Welsch | 416/140 |
| 1,592,242 | A | * | 7/1926 | Welsch | 416/153 |
| 4,430,044 | A | * | 2/1984 | Liljegren | 416/119 |
| 4,468,169 | A | * | 8/1984 | Williams | 416/119 |

* cited by examiner

*Primary Examiner* — Christopher Verdier

(57) ABSTRACT

A windmill rotates on a vertical axis, with plural articulated working members circling around. Each working member has a pivotal edge like a vane, a flag or a hinged door, swings on its own axis and is also rotatable around the central axis. On the axis of each working member is furnished a joint controller to restrain the movement of each, flipping and engaging the favorable wind in about ¾ turn of the central axis but disengaging in the rest ¼ turn. The engagement of the controller is elastically releasable on excessive load or over-speeding, allowing the respective working member to skip the engaging temporarily during each rotation.

2 Claims, 7 Drawing Sheets

RESPONSIVE WINDMILL

BACKGROUND OF THE APPLICATION (1) Field of the Application

The present application related to U.S. patent classification 416: FLUID REACTION SURFACES (I.E., IMPELLERS)

(2) Description of Related Art

Some prior art which was within those most similar, each contains one or some issues:

Difficult to self-start;
Engaging all including negative and excessive wind;
Half engaging half disengaging;
Lack of or not effective at over-load protection;
Lack of or not effective at over-speed protection.

BRIEF SUMMARY OF THE APPLICATION

The present application tries to provide a simple, cost effective and reliable windmill, featuring:

Self-start;
Work on three quarters of each revolution on favorable wind and avoid the negative impact of the rest;
Work with all wind conditions, all wind directions;
Provide over-load and over-speed protection by allowing each working member to disengage temporarily then restore during each revolution.

Conclusion:

The present application is about a vertical axis windmill, more specifically, a windmill has each working member equipped with a controller to control whether swinging or pivoting of respective working member, including: a radial cam with a portion of inwardly indented surface being mounted on the joint shaft, and an assembly of the controller with a follower tip elastically coupling into the inwardly indentation of the cam;

the controller's follower tip which is movable outwardly from the central axis against a coil spring, wherein the torque encountered tends to push the follower tip out of the indentation of the cam to make a disengagement of the respective working part in case of overload; wherein the centrifugal force developed by the rotating rotor also tends to push the follower outwardly from the central axis to cause a disengaging movement in case of overspeed;

the controller would allow the working member to disengage temporarily until the next turn.

DETAILED DESCRIPTION OF THE APPLICATION

The present application relates to a windmill comprising plural working members pivotally attached to a rotor structure to rotate around a central axis.

01. Rotor, includes
   01*a*. upper arm, and
   01*b*. lower arm, assembled on
   01*c*. central shaft, being able to rotate on the central axis.

On each far end of rotor arms provided holes to contain joint bearings for working members.

Each working member includes:

02. Joint shaft or elbow shaft or satellite shaft, being able to rotate on respective axis parallel to central axis.

Figure 3:
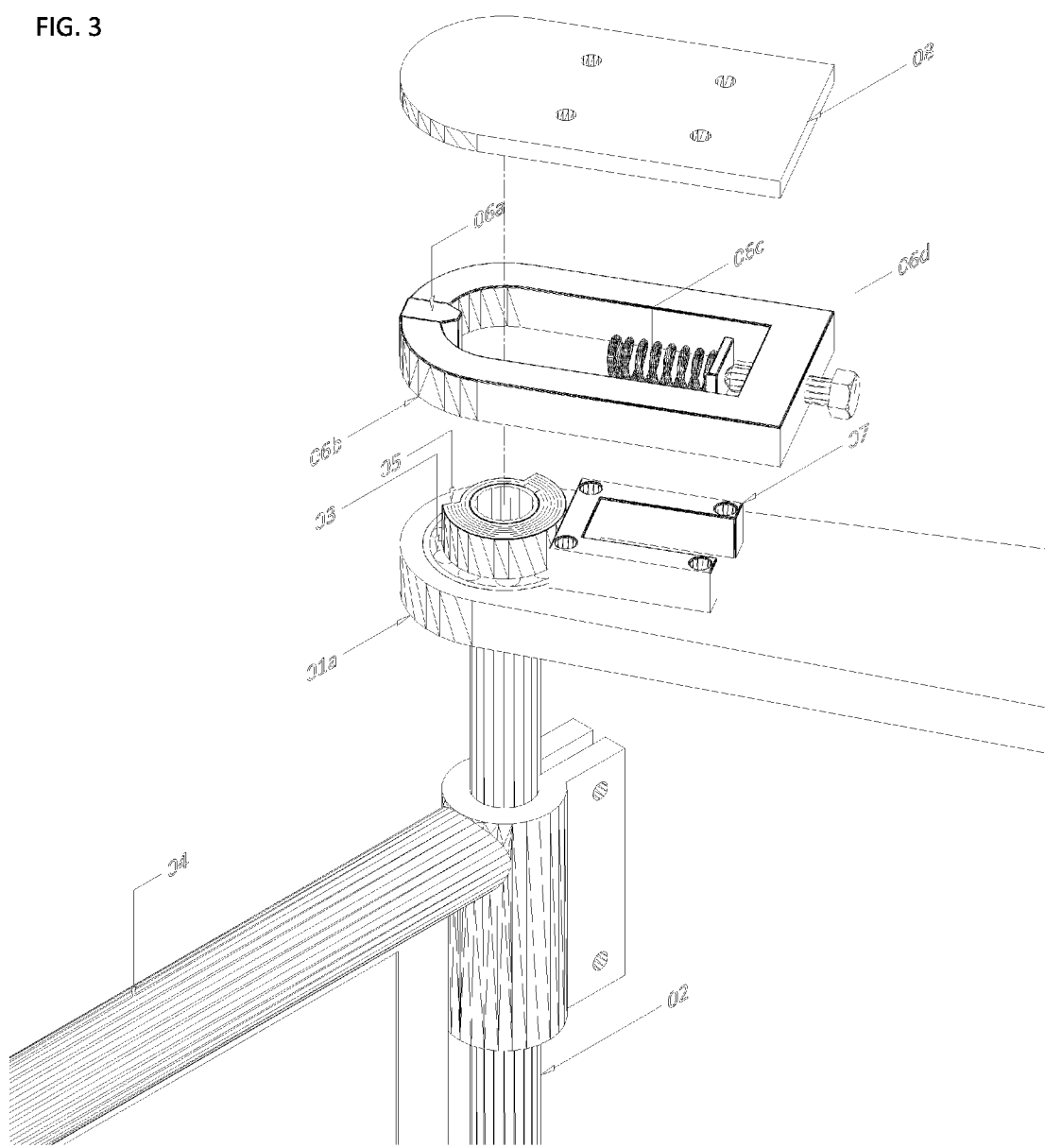
FIG. 3: Perspective partial view of the upper part around 11 o'clock, with some disassembled parts.

03. Joint bearing, being assembled on each end of joint shaft 02, only showing in FIG. 3.

04. Working part assembly, equivalent to a sail, a vane, a blade or a wing mounted on joint shaft with leading edge near to respective joint axis and trailing edge to spin about the same axis.

For each working member furnished a joint controller on each joint shaft 02 to control whether swinging or pivoting of each working part 04.

The controller's pivoting part is:

05. A radial cam mounted on the extension of joint shaft 02, peripherally having a part of inwardly indented curvature which allows the follower tip to couple in within freedom of 90 degrees and couple out the rest 270 degrees.

The controller's slidable assembly 06 includes:

06*a*. follower tip, shaped as a single tooth of pressure angle 20 degrees to couple into the inward indentation of cam 05, being fixed in the far end of 06*b*. follower case, containing other parts of the controller; and 06*c*. coil spring, normally to keep the engagement of follower with the cam; and 06*d*. set screw, to adjust the engagement threshold.

The controller's mounting part includes:

07. Control guide mounted on the rotor arm for locating and guiding of respective slidable assembly 06.

08. Controller cover, covers each slidable assembly 06 but allows the sliding movement of the same, being shown in FIG. 3 only.

The slidable assembly 06 of joint controller may be able to slide outwardly from the central axis along the control guide 07 against the coil spring 06*c*.

The controller is configured to allow each working-part 04 to skew to center-to end radial line of respective rotor arm 30° then swing out 90° about axis of respective joint shaft 02.

Figure 1:
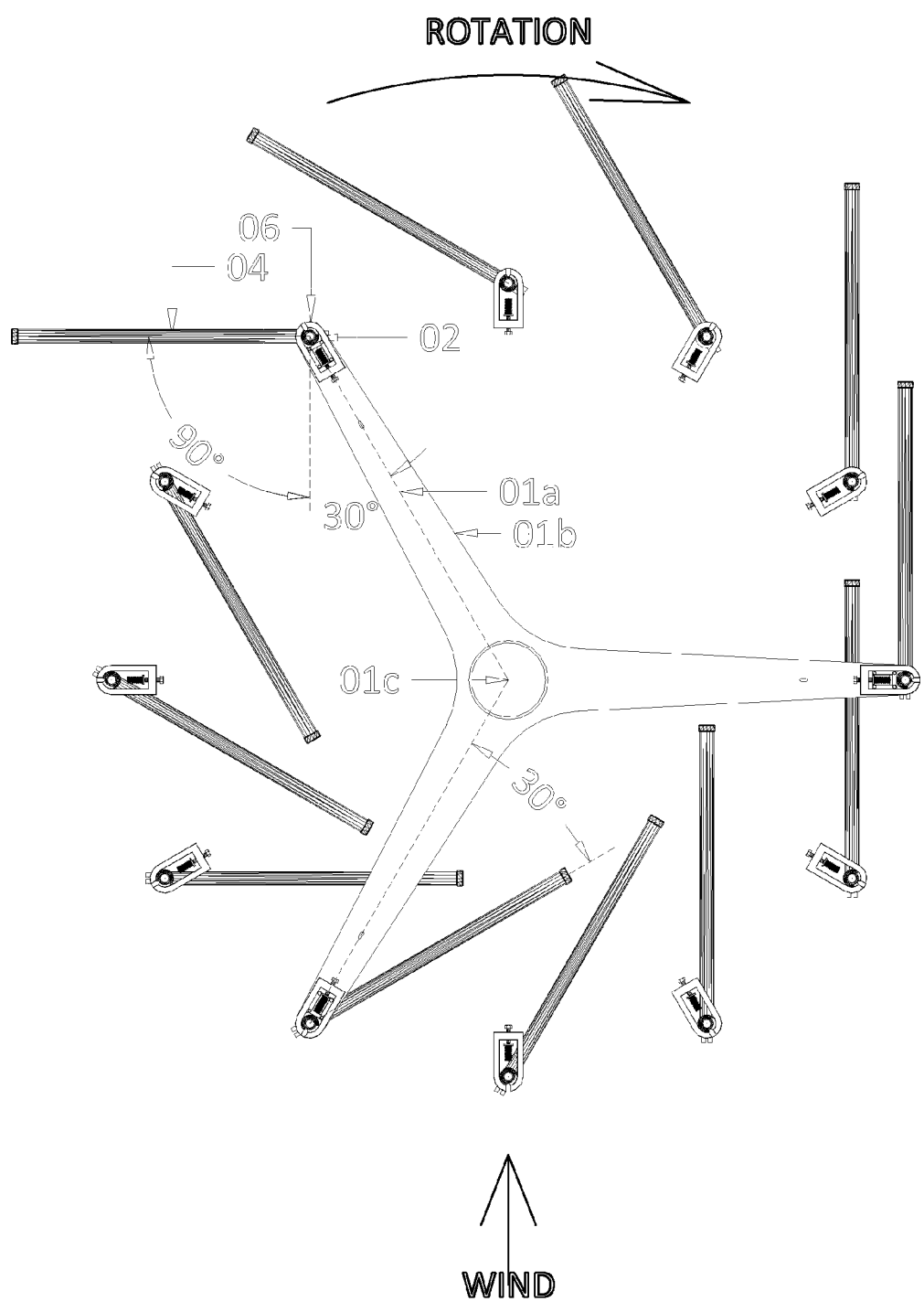
FIG. 1: Shows the top view of a clock plan for working members on hourly position; the rotor rotates clockwise while wind blows from 6 o'clock toward 12 o'clock; some parts are omitted from showing.
Figure 2:
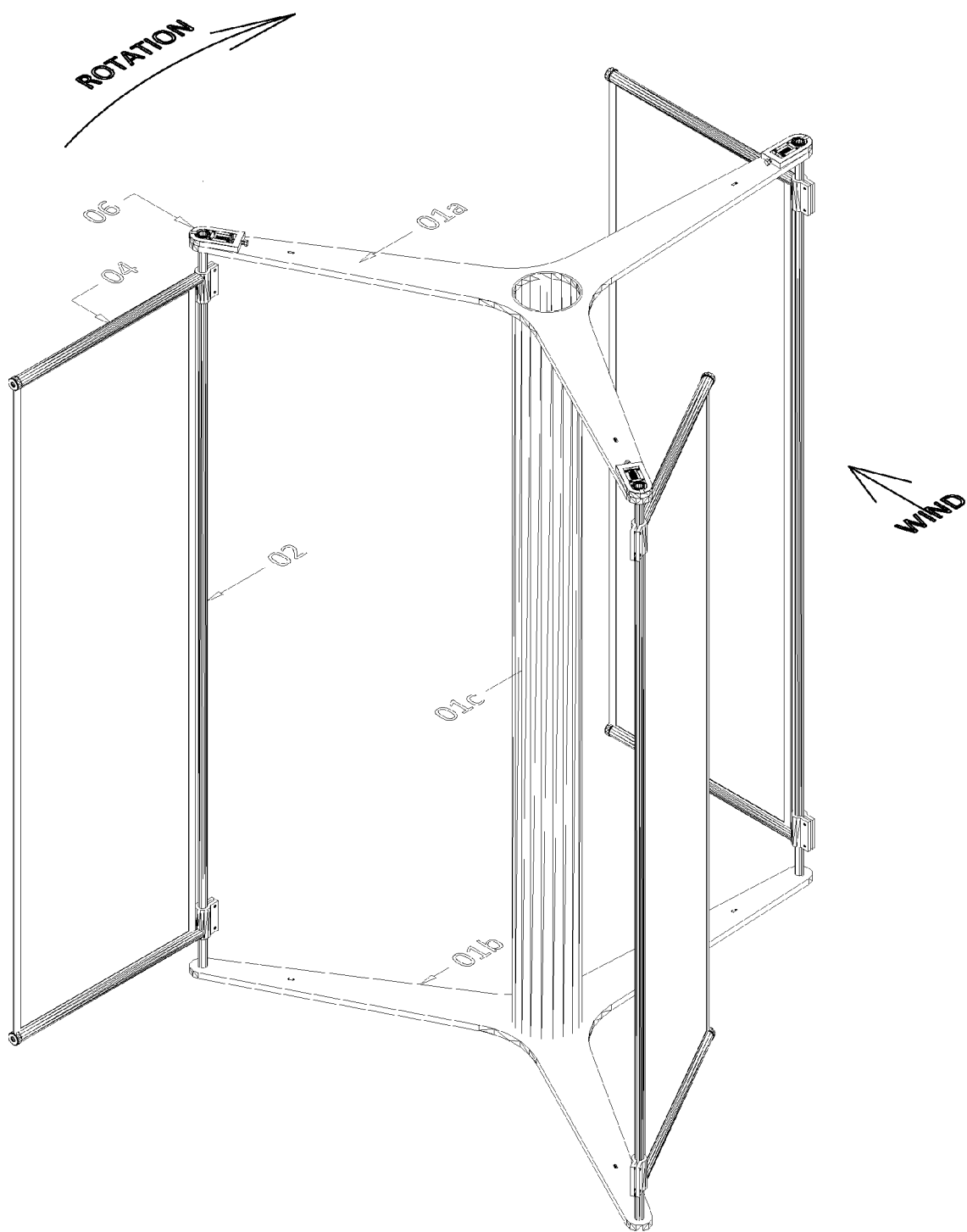
FIG. 2: Perspective SW isometric view.
Figure 4:
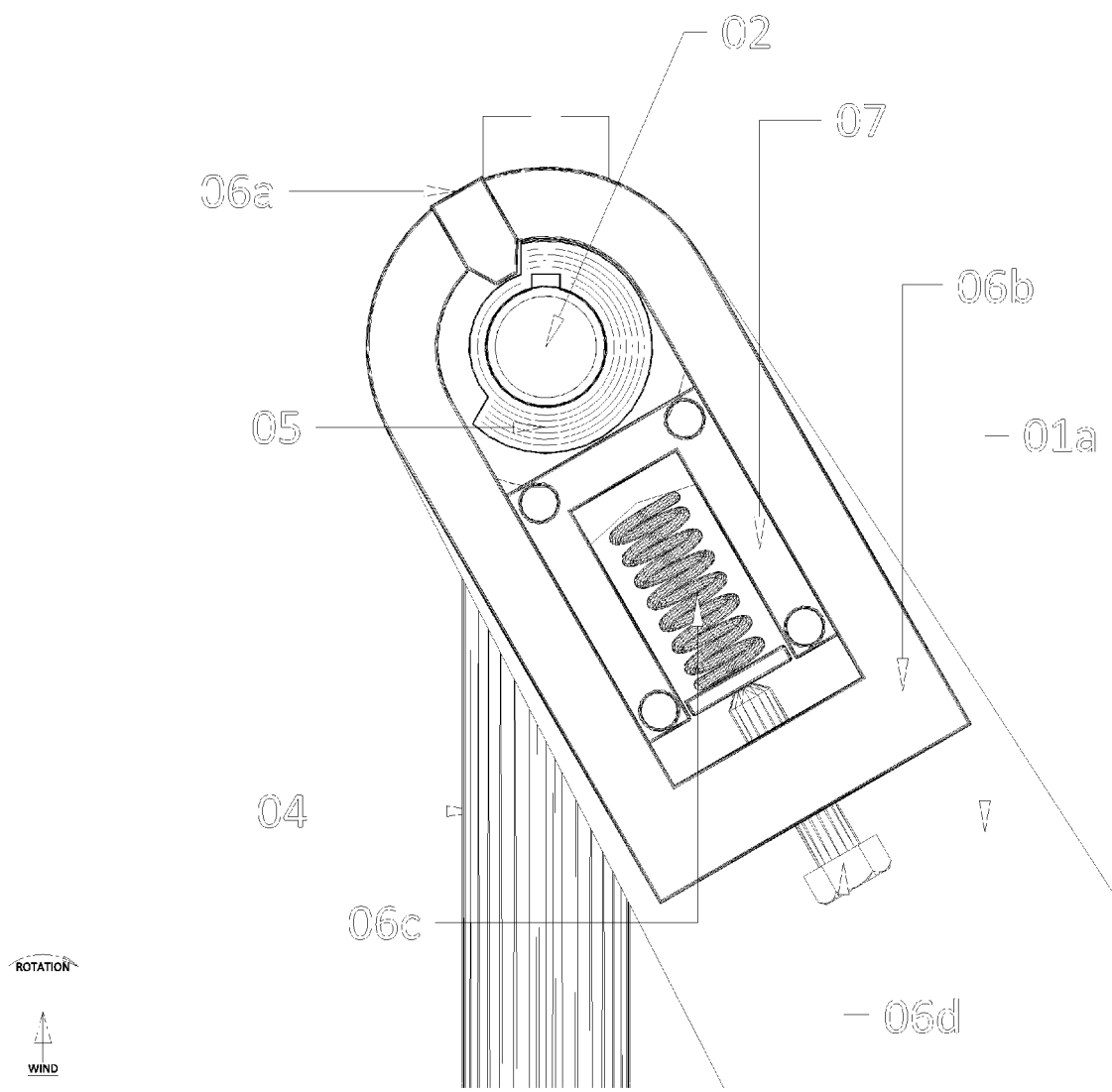
FIG. 4: Partial view around 11 o'clock, working part is ready to flip.
Figure 7:
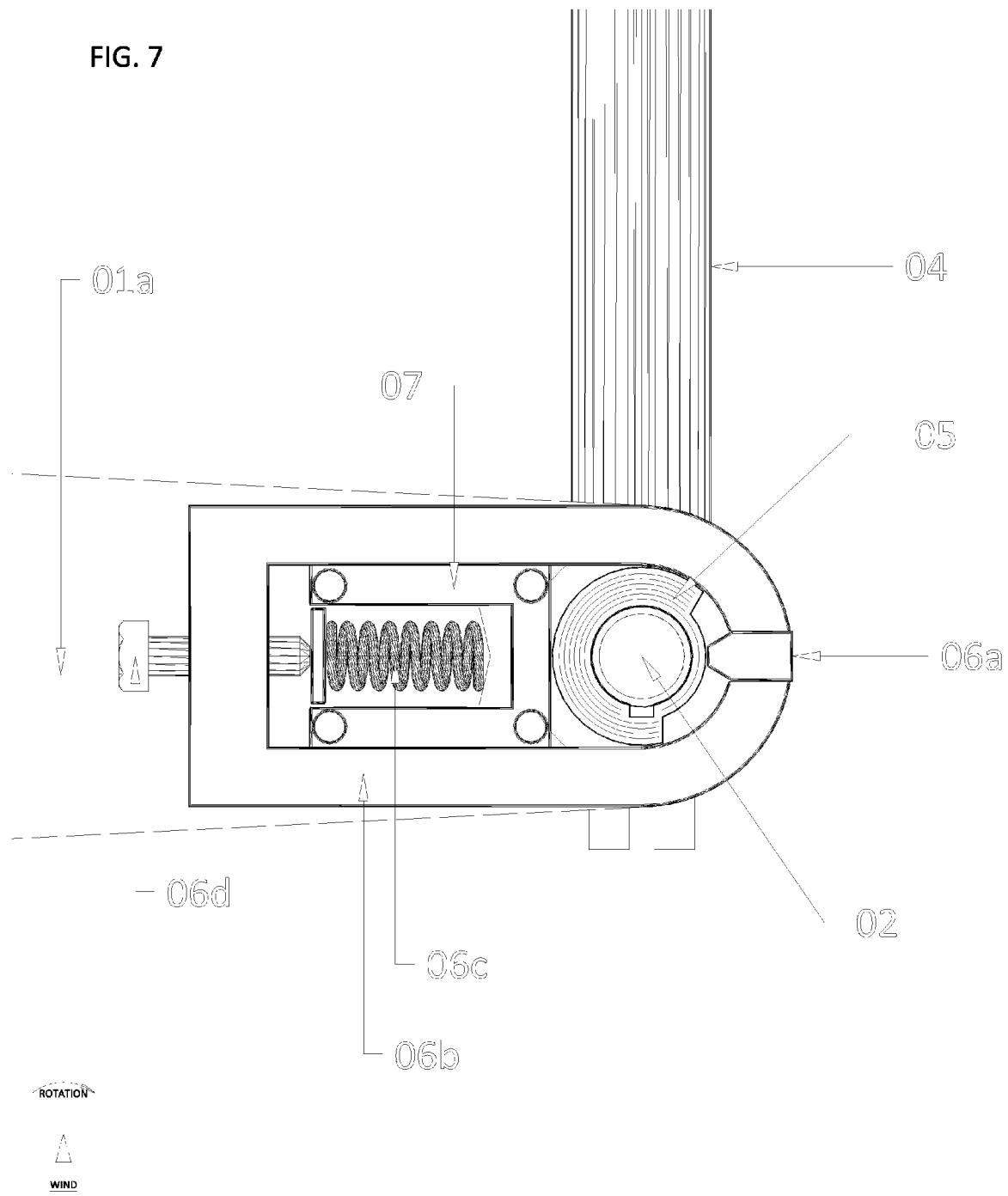
FIG. 7: Partial view at 3 o'clock, disengaged on unfavorable wind.

The device is set to work in such a manner:

Suppose the wind blows on a clock pointing the direction of from 6 o'clock to 12 o'clock, with a working member installed on the far end of short hand (see FIG. 1). At 6 o'clock the outward side of the working part 04 is facing the wind and pushes the windmill to rotate clockwise until 11 o'clock (see FIG. 4), as the wind blows straight on the trailing edge, that makes the same working part to swing outwardly and flips to other side (see FIG. 5 or FIG. 1), and continues to push positively until 2 o'clock, at this point the 04 is set free to go against the unfavorable wind like a weather vane rooster with the trailing edge pointing the wind direction (see FIG. 7 or FIG. 1, at 3 o'clock), until 5 o'clock (see FIG. 1).

Figure 5:
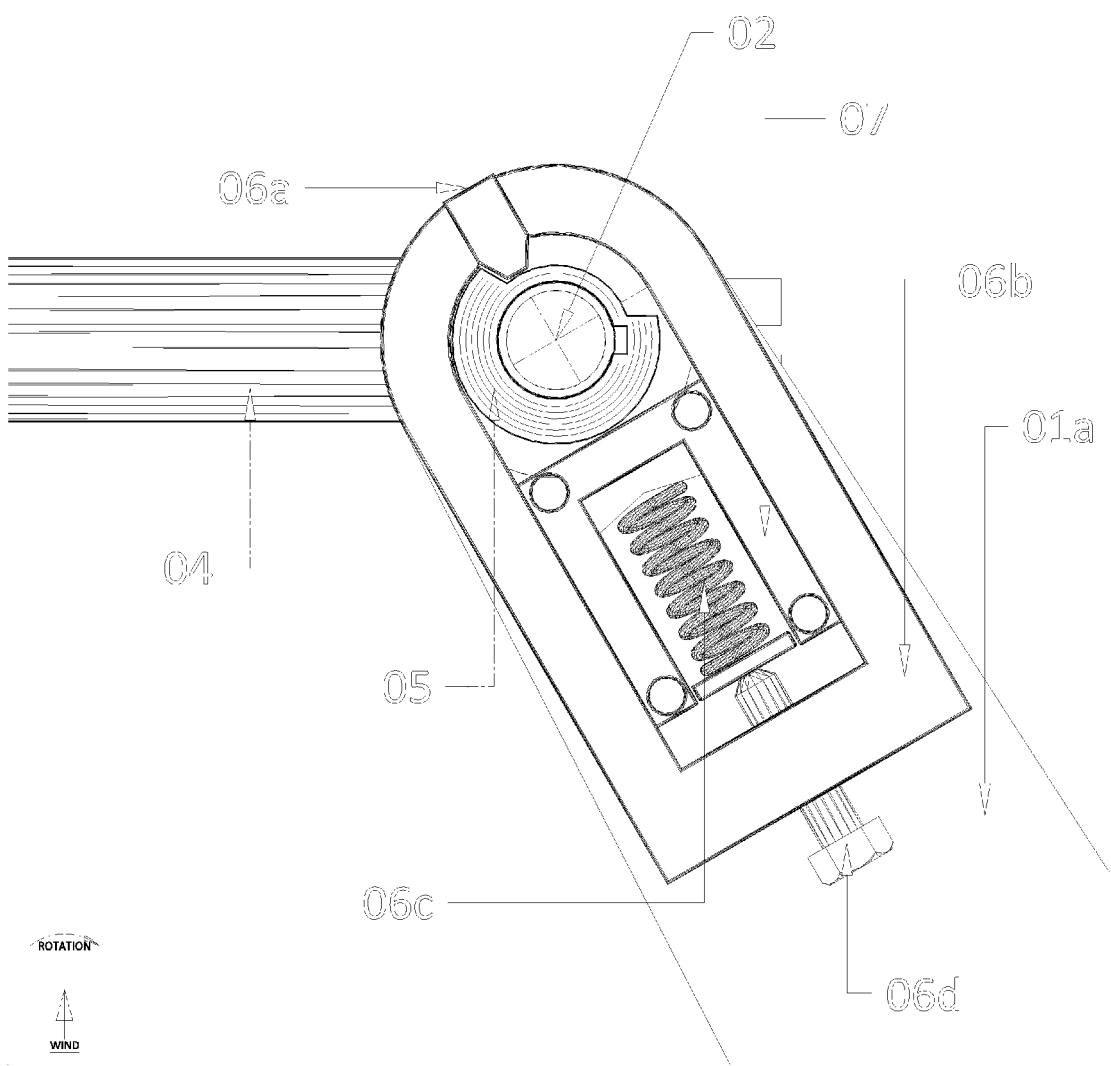
FIG. 5: Partial view around 11 o'clock, flipped.
Figure 6:
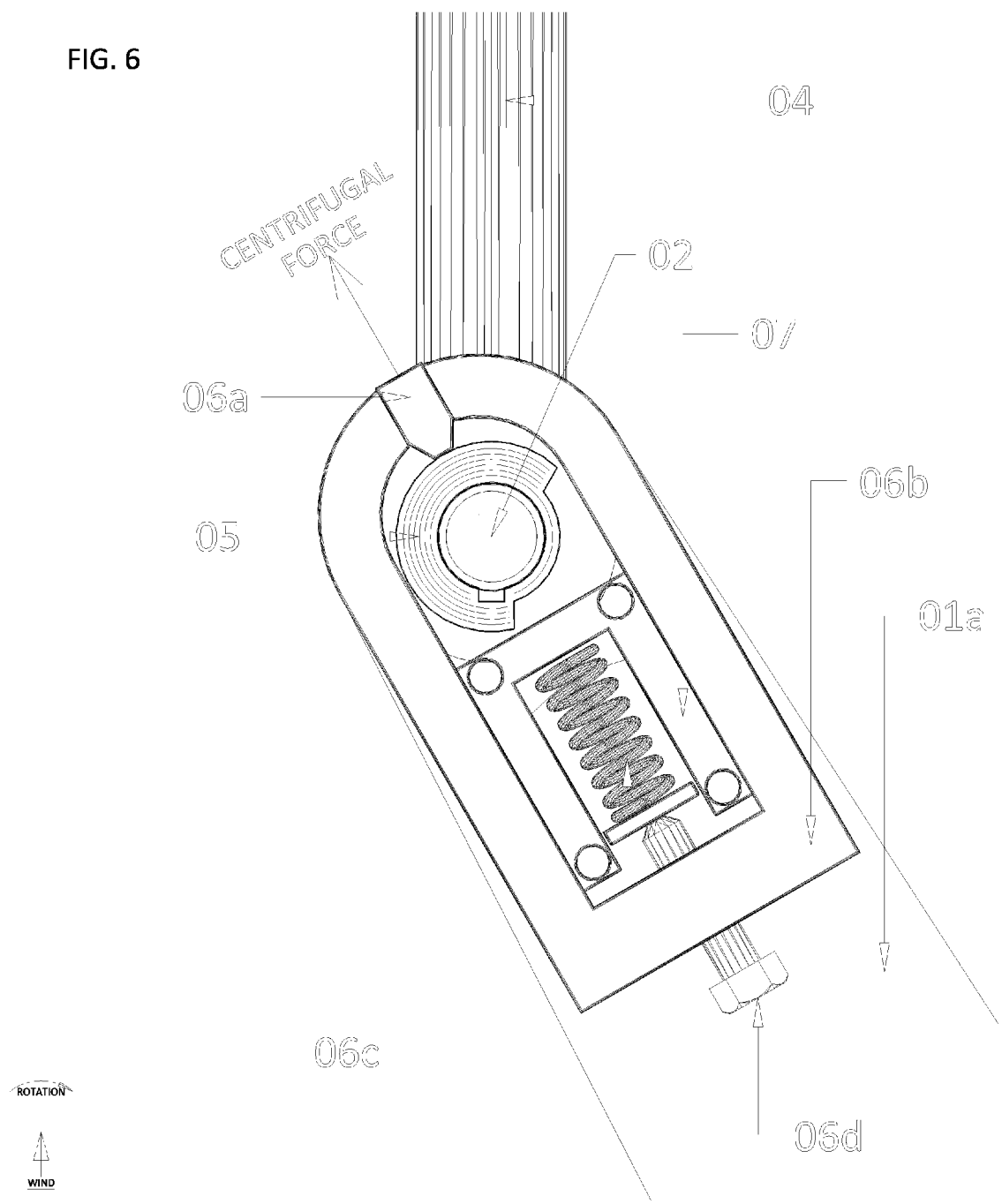
FIG. 6: Partial view around 11 o'clock, disengaged on excessive wind.

The torque encountered tends to push the follower tip 06*a* out of the indentation of the cam 05 to make a disengaging of the respective working part 04 in case of over-load; that movement would temporary set the working part 04 free with trailing edge pointing to the wind direction (see FIG. 6 compare FIG. 5).

The centrifugal force developed by the rotating rotor tends to push the slidable assembly outwardly from the central axis, and also cause a disengaging movement in case of over-speeding (see FIG. 6 compare FIG. 5).

The invention claimed is:

1. A windmill responsive to the wind blowing across its longitudinal axis, comprising:
    a central shaft being rotatable;
    a rotor structure mounted on the central shaft with plural pivoting working members equally spaced around the central shaft;
    each working member including:
        a working part assembly being mounted on
        a joint shaft which is parallel to the central shaft axis with joint bearings on both ends of the same shaft;
    a controller to control whether swinging or pivoting of each working member, including:
        a radial cam with a portion of inwardly indented surface being mounted on the joint shaft, and
        an assembly of the controller with a follower tip elastically coupling into the inwardly indented surface of the cam;
    the controller being configured normally to allow the respective working-part to skew to a respective rotor arm 30 degrees then swing out 90 degrees about the axis of the respective joint shaft;
    wherein the controller's follower tip is movable outwardly from the central axis against a coil spring;
    wherein the torque encountered tends to push the follower tip out of the indented surface of the cam to make a disengagement of the respective working part in case of over-load;
    wherein the centrifugal force developed by the rotating rotor also tends to push the follower outwardly from the central axis to cause a disengaging movement in case of over-speed.

2. A windmill as defined in claim 1, wherein the control on each working member's movement is due to its response to the wind exerted on it;
    each working member flips to engage the favorable wind twice in about ¾ rotation of the central axis but to disengage in the rest ¼ rotation going into the unfavorable wind like a weather vane with its trailing edge pointing to the wind direction;
    or in case of excessive wind, the controller would allow the working member to disengage temporarily until the next turn.

* * * * *